United States Patent

Nishida

[11] Patent Number: 6,106,432
[45] Date of Patent: Aug. 22, 2000

[54] OUTPUT POWER CONTROL APPARATUS FOR INTERNAL COMBUSTION ENGINE OF MOTOR VEHICLE

[75] Inventor: Shinichi Nishida, Tokyo, Japan

[73] Assignee: Mitsubishi Denki Kabushiki Kaisha, Tokyo, Japan

[21] Appl. No.: 09/253,773

[22] Filed: Feb. 22, 1999

[30] Foreign Application Priority Data

Aug. 24, 1998 [JP] Japan ................................. 10-237290

[51] Int. Cl.$^7$ ...................................................... F02D 1/00
[52] U.S. Cl. ...................... 477/116; 477/117; 477/107; 477/111
[58] Field of Search .................................. 477/107, 110, 477/111, 116, 117; 123/339.16, 339.17, 339.18, 339.23, 339.24

[56] References Cited

U.S. PATENT DOCUMENTS

| | | | |
|---|---|---|---|
| 4,671,139 | 6/1987 | Downs et al. | 477/143 X |
| 5,289,739 | 3/1994 | Muscaro et al. | 477/107 |
| 5,466,199 | 11/1995 | Kobayashi et al. | 477/107 |
| 5,478,293 | 12/1995 | Yonezawa | 477/110 X |
| 5,701,867 | 12/1997 | Mizutani et al. | 123/339.16 |
| 5,720,693 | 2/1998 | Mori | 477/107 |
| 5,795,262 | 8/1998 | Robinson | 477/111 X |

FOREIGN PATENT DOCUMENTS

| | | |
|---|---|---|
| 2-201061 | 8/1990 | Japan . |
| 3-141841 | 6/1991 | Japan . |

Primary Examiner—Khoi Q. Ta
Attorney, Agent, or Firm—Sughrue, Mion, Zinn, Macpeak & Seas, PLLC

[57] ABSTRACT

An output power control apparatus for an internal combustion engine of a motor vehicle, which apparatus can enhance drivability of the motor vehicle regardless of shift operation of a transmission by suppressing positively abrupt start of the motor vehicle and shift shock due to increase of load applied to the transmission upon shift operation thereof from a neutral range to a drive range. The output power control apparatus includes an intake pipe (7) for supplying intake air to an internal combustion engine (6) mounted on a motor vehicle, a throttle valve (8) installed in the intake pipe (7) for regulating an amount of the intake air supplied to the engine (6), a throttle actuator (9) for adjusting an opening degree (θ) of the throttle valve (8), a transmission (13) for transmitting output power of the engine (6) to a wheel system of the motor vehicle, a shift information detecting means for detecting shift of the transmission (13) to thereby generate shift information (SR), an accelerator sensor (2) for detecting a accelerator pedal actuation quantity (α) which corresponds to a depression stroke of an accelerator pedal (1), and a throttle control means (15A, 15B, 15C) for setting a control quantity (C) for the throttle actuator (9) on the basis of at least the shift information (SR) and the accelerator pedal actuation quantity (α), wherein the throttle control means (15A, 15B, 15C) incorporates a control quantity suppressing means (16, 16B, 16C) for suppressing the control quantity (C) at least over a predetermined time period succeeding to shift operation of the transmission (13) when the shift information (SR) indicates the shift operation of the transmission (13) from the neutral range (N range) to the drive range (D range).

10 Claims, 10 Drawing Sheets

OUTPUT POWER CONTROL APPARATUS FOR INTERNAL COMBUSTION ENGINE OF MOTOR VEHICLE

BACKGROUND OF THE INVENTION

1. Field of the Invention

The present invention relates to an output control apparatus for an internal combustion engine of a motor vehicle equipped with a transmission, which apparatus is destined for controlling electrically an opening degree of a throttle valve for thereby regulating an amount or flow rate of intake air supplied to the engine by means of a throttle actuator. More particularly, the present invention is concerned with an engine power control apparatus for a motor vehicle, which apparatus can prevent sudden start of a motor vehicle and a shift shock which is likely to occur when the transmission is shifted from a neutral range (inclusive of a parking range) to a drive range (inclusive of a reverse range), to thereby enhance drivability of the motor vehicle substantially independent of the shift operation of the transmission.

2. Description of Related Art

Figure 8:
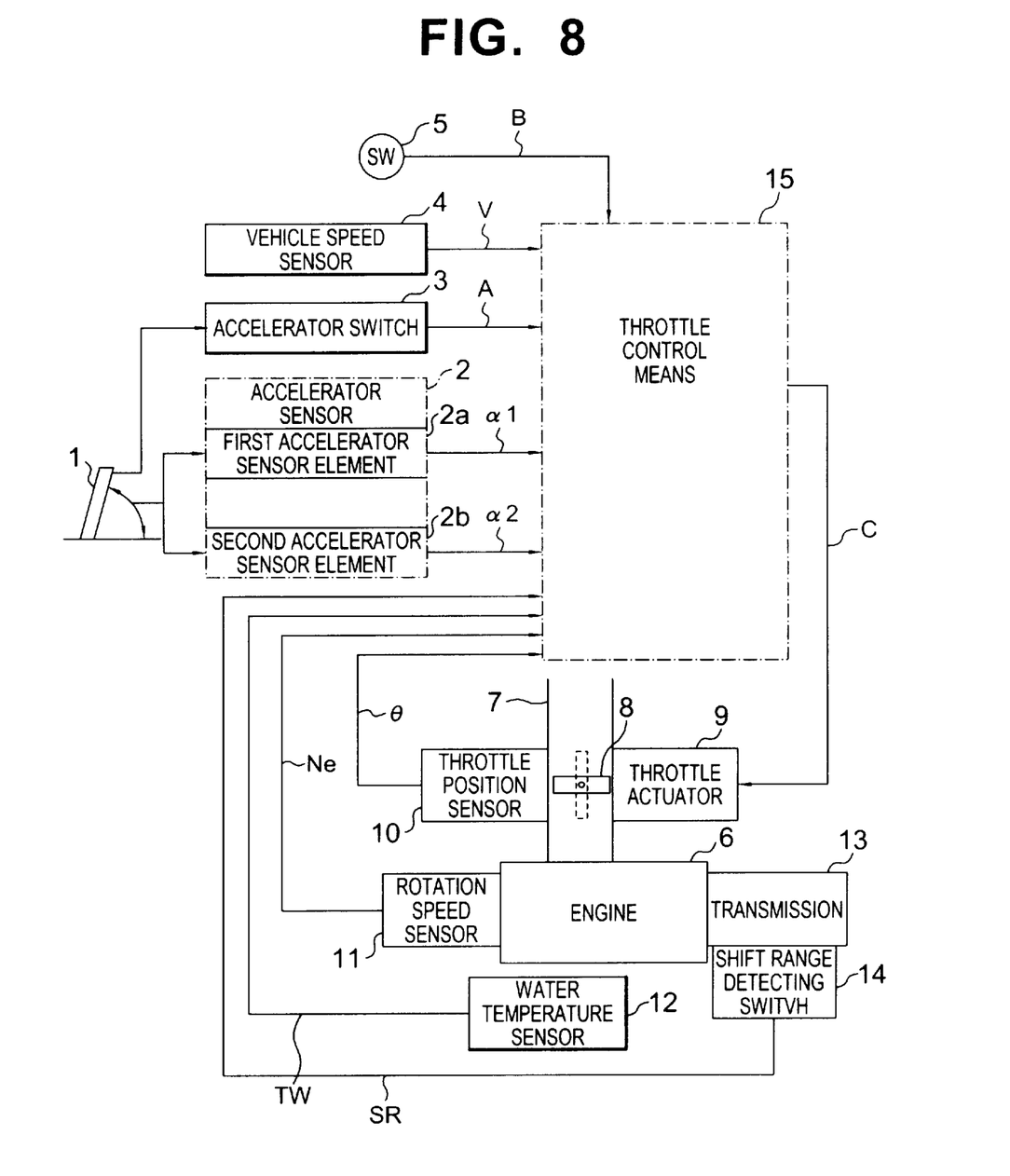
FIG. 8 is a block diagram showing schematically a general arrangement of a hitherto known output power control apparatus for an internal combustion engine of a motor vehicle.

For having better understanding of the invention, background techniques thereof will first be reviewed in some detail. FIG. 8 is a block diagram showing schematically a hitherto known or conventional output power control apparatus for an internal combustion engine of a motor vehicle, as disclosed, for example, in Japanese Unexamined Patent Application Publication No. 14181/1991 JP-A-3-14181. In the figure, reference numeral 1 designates an accelerator pedal actuated by a driver for acceleration of an internal combustion engine and hence a motor vehicle equipped with the engine.

There are provided in association with the accelerator pedal 1, an accelerator sensor 2 and an accelerator switch 3, wherein the accelerator sensor 2 serves for detecting the accelerator pedal actuation quantities α1 and α2 (opening degree of a throttle valve) corresponding to the accelerator pedal depression strokes, respectively, while the accelerator switch 3 serves for detecting whether the accelerator pedal 1 is actuated or not.

The accelerator sensor 2 is comprised of a first accelerator sensor element 2a for detecting the first accelerator pedal actuation quantity α1 and a second accelerator sensor element 2b for detecting the second accelerator pedal actuation quantity α2. Further, the accelerator switch 3 serves also as an idle switch and outputs an idle signal A when the accelerator pedal 1 is not actuated.

On the other hand, the motor vehicle is equipped with a vehicle speed sensor 4 for detecting a vehicle speed V, a main switch 5 for outputting a start signal B indicating the start of the motor vehicle which is put into operation when the switch 5 is closed by the driver, and an internal combustion engine (hereinafter also referred to simply as the engine) 6 for generating power or torque for driving the motor vehicle.

The engine 6 is provided with an intake pipe 7 for supplying intake air to the engine 6. On the other hand, the intake pipe 7 is provided with a throttle valve 8 for regulating the flow rate of the intake air supplied to the engine 6, and a throttle actuator 9 for adjusting the opening degree θ of the throttle valve 8 (hereinafter also referred to as the throttle opening degree θ).

Further provided in association with the intake pipe 7 is a throttle position sensor 10 for detecting the opening degree θ of the throttle valve. On the other hand, provided in association with the engine 6 are a rotation speed sensor 11 for detecting the engine rotation number Ne (rpm) and a water temperature sensor 12 for detecting the water temperature TW of engine cooling water. The signal outputted from the water temperature sensor 12 and indicating the temperature of cooling water is used for the engine control as described hereinafter.

The engine 6 has an output shaft to which a transmission 13 is operatively coupled for transmitting output torque to the driving wheels of the motor vehicle. Provided in association with the transmission 13 is a shift range detecting switch 14 for detecting shift information SR of the transmission 13. Parenthetically, it should be mentioned that an oil temperature sensor (not shown) is provided for detecting oil temperature of the transmission 13, wherein the output signal of the oil temperature sensor can be utilized also as temperature information similarly to the water temperature TW of the engine 6.

Of the various sensor signals or information, the vehicle speed V, the engine rotation number Ne (rpm), the water temperature TW (or oil temperature of the transmission 13), the shift information SR and the accelerator pedal actuation quantity α can provide information concerning the load state of the engine 6.

A throttle control means 15 for controlling the throttle actuator 9 may be constituted by a microcomputer and an electronic control unit (also referred to as the ECU in abbreviation) which incorporates a memory.

The throttle control means 15 is designed to arithmetically determine a control quantity C on the basis of various sensor information such as the accelerator pedal actuation quantity α, the idle signal A, the vehicle speed V, the start signal B, the throttle opening degree θ, the engine rotation number Ne (rpm), the water temperature TW and the shift information SR.

More specifically, the throttle control means 15 is so designed as to arithmetically determine the desired throttle opening degree θo of the throttle valve 8 on the basis of the load information including at least the shift information SR and the accelerator pedal actuation quantity θ in accordance with a program stored previously in the memory by using data also stored therein, to thereby set a control quantity C for the throttle actuator 9 on the basis of deviation or difference Δθ between a detected throttle opening degree θ and a desired throttle opening degree θo (Δθ=θo−θ).

In other words, the throttle control means 15 sets the control quantity C such that the throttle opening degree θ coincides with the desired throttle opening degree θo so that the deviation Δθ becomes zero, to thereby control electrically the throttle actuator 9 on the basis of the control quantity C.

Now, description will turn to operations of the conventional control apparatus shown in FIG. 8.

When the operator or driver closes the main switch 5 by inserting key into a key slot for starting the motor vehicle, a starter motor (not shown) is electrically energized, and at the same time the start signal B is generated, in response to which the throttle control means 15 is actuated.

At this time point, however, the accelerator pedal 1 is not yet operated. Consequently, the idle signal A is generated by the accelerator switch 3. Further, the throttle valve 8 is fully closed.

Consequently, the throttle control means 15 supplies to the throttle actuator 9 a signal indicative of the control quantity C which corresponds to the desired throttle opening degree θo when the starter motor is to be started in the state where the throttle valve 8 is fully closed.

In response, the throttle actuator 9 moves the throttle valve 8 installed within the intake pipe 7 to a position corresponding to the desired throttle opening degree θo from the fully closed position to thereby allow an amount of intake air demanded for starting the motor vehicle supplied to the engine 6. Thus, operation of the engine 6 can be started.

Subsequently, when the driver depresses the accelerator pedal 1 in order to accelerate the motor vehicle, the throttle control means 15 responds thereto by determining arithmetically the desired throttle opening degree θo corresponding to the accelerator pedal actuation quantity (depression stroke) α derived from the output of the accelerator sensor 2.

Further, the throttle control means 15 arithmetically determines deviation or difference Δθ between the desired throttle opening degree θo and the detected throttle opening degree θ to thereby supply to the throttle actuator 9 a signal indicating the control quantity C which can make the deviation Δθ zero.

Thus, the throttle actuator 9 is supplied with an electric power conforming to the control quantity C from an on-board battery (not shown) to drive the throttle valve 8 until the throttle opening degree θ coincides with the desired throttle opening degree θo.

Further, when speed change gear position is changed by the driver from a neutral range (hereinafter referred to as the N range inclusive of the parking range) to a driver (hereinafter referred to as the D range inclusive of a reverse range) through shift operation of the transmission 13 operatively coupled to the engine 6, the shift range detecting switch 14 outputs a signal indicating the shift information SR.

Then, the throttle control means 15 discriminatively decides the load-increased state of the transmission 13 on the basis of the shift information SR to determine arithmetically the control quantity C which is so corrected as to increase the desired throttle opening degree θo by a proper value for preventing the engine rotation number Ne (rpm) from lowering due to increase of the load applied to the transmission 13.

In this conjunction, it is however noted that a delay time td is involved until the speed-change gear position to which the transmission 13 is shifted through the above-mentioned shift operation becomes actually effective, as is known in the art.

Consequently, before the delay time td has lapsed, there may arise such situation in which the incremental correction of the throttle opening degree θ continues to be carried out by the throttle control means 15, as a result of which the throttle opening degree θ is corrected in excess and hence the engine rotation number Ne (rpm) increases excessively, providing a cause for a sudden or abrupt start of the motor vehicle or occurrence of remarkable shock applied to the driver, to disadvantage. Hereinafter, the shock which may occur upon shift operation of the transmission will be referred to as the shift shock.

Figure 9:
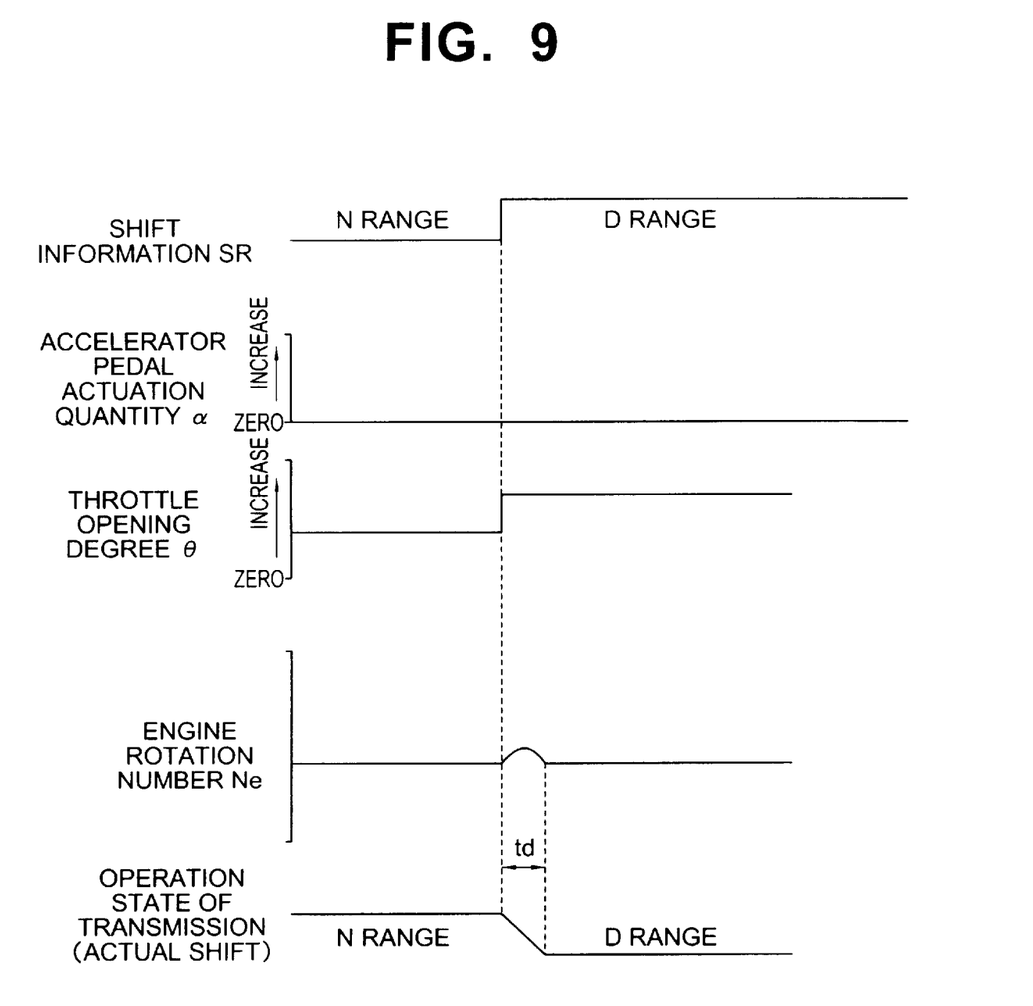
FIG. 9 is a timing chart for illustrating operation of the conventional engine output control apparatus upon shift operation of transmission with a throttle valve being held in a fully closed state.
Figure 10:
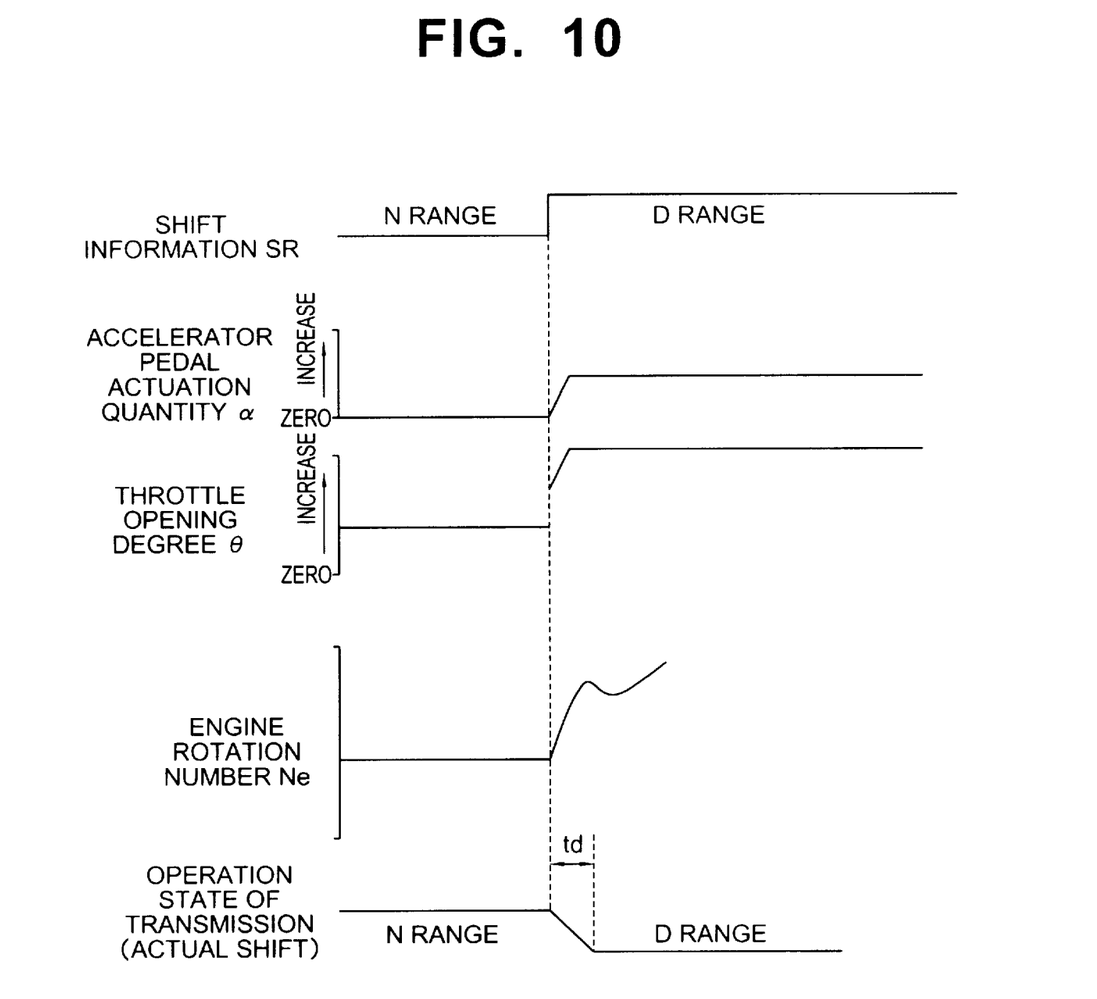
FIG. 10 is a timing chart for illustrating operation of the conventional engine output control apparatus upon shift operation of transmission in the case where an accelerator pedal actuation quantity is increased immediately after the transmission shift operation.

FIGS. 9 and 10 are timing charts for illustrating operations of the conventional output power control apparatus for the internal combustion engine of a motor vehicle, wherein FIG. 9 is depicted on the presumption that the transmission is shifted from the N range to the D range with the throttle valve being held in the fully closed state, while FIG. 10 is depicted on the assumption that the accelerator pedal actuation quantity α increases immediately after the shift of the transmission from the N range to the D range.

Referring to FIG. 9, the throttle opening degree θ increases immediately in response to the transmission shift information SR indicating the shift to the D range from the N range.

Consequently, immediately in succession to the shift operation of the transmission 13, the state in which the throttle opening degree θ is corrected in excess prevails over a period corresponding to the delay time td involved before the shifted position of the transmission 13 becomes effective, as a result of which the engine rotation number Ne (rpm) increases remarkably.

For this reason, shock of large magnitude will occur upon shift manipulation of the transmission 13, being accompanied with sudden start of the motor vehicle.

Referring to FIG. 10, when the accelerator pedal 1 is depressed immediately after the shift of the transmission 13 from the N range to the D range, the throttle opening degree θ increases further in response to the increase of the accelerator pedal actuation quantity α.

Consequently, the engine rotation number Ne (rpm) increases further, which in turn means that shock due to the shift manipulation increases while the speed of the motor vehicle becomes more likely to increase abruptly.

As will be appreciated from the foregoing, in the conventional output power control apparatus for the internal combustion engine of the motor vehicle, the throttle opening degree θ is corrected incrementally in response to the shift information SR generated upon shift manipulation of the transmission 13 from the N range to the D range, as a result of which the throttle opening degree θ is corrected in excess over the period corresponding to the delay time td inherent to the transmission 13. Consequently, abrupt start of the motor vehicle as well as the so-called shift shock of remarkably large magnitude will be incurred. Thus, drivability of the motor vehicle is degraded upon shift manipulation, to a disadvantage.

In particular, when the accelerator pedal 1 is depressed after the transmission 13 is shifted from the N range to the D range, the throttle opening degree θ increases further, whereby the sudden start of the motor vehicle is more likely to occur.

SUMMARY OF THE INVENTION

In the light of the state of the art described above, it is an object of the present invention to provide an output power control apparatus for an internal combustion engine of a motor vehicle, which apparatus can enhance drivability of the motor vehicle regardless of shift operation of a transmission by suppressing or preventing positively abrupt or sudden start of the motor vehicle and shift shock due to increase of load applied to the transmission and the motor vehicle upon shift operation of transmission from the N range to the D range.

In view of the above and other objects which will become apparent as the description proceeds, there is provided according to a general aspect of the present invention an output power control apparatus for an internal combustion engine of a motor vehicle, which includes an intake pipe for supplying intake air to the internal combustion engine mounted on the motor vehicle, a throttle valve installed in the intake pipe for regulating an amount of the intake air supplied to the engine, a throttle actuator for adjusting an opening degree of the throttle valve, a transmission for transmitting output power of the engine to a wheel system of the motor vehicle, a shift information detecting means for detecting shift of the transmission to thereby generate shift information, an accelerator sensor for detecting a accelerator pedal actuation quantity which corresponds to a depression stroke of an accelerator pedal, and a throttle control means for setting a control quantity for the throttle actuator on the basis of at least the shift information and the accelerator pedal actuation quantity, wherein the throttle control means includes a control quantity suppressing means for suppressing the control quantity at least over a predetermined time period succeeding to shift operation of the transmission when the shift information indicates shift operation of the transmission from a neutral range to a drive range.

With the arrangement described above, sudden start or acceleration of the motor vehicle as well as shift shock which may otherwise occur upon shift operation of the transmission from the N range to the D range due to increase of the load imposed on the transmission and hence the engine can be suppressed or prevented with enhanced reliability. Thus, according to the present invention, there is provided an output power control apparatus for the internal combustion engine of the motor vehicle, which apparatus can enhance significantly the drivability of the motor vehicle substantially independently from the shift operation of the transmission.

In a preferred mode for carrying out the invention, the predetermined time period may be so set as to correspond to a delay time involved before operation of the transmission becomes effective in reality at the shifted position.

In another mode for carrying out the invention, the control quantity suppressing means may be so designed as to suppress increasing rate of the control quantity to be lower than a predetermined value inclusive thereof over the predetermined time period from the shift operation of the transmission from the neutral range to the drive range.

In yet another preferred mode for carrying out the invention, the control quantity suppressing means may be so designed as to be capable of setting the increasing rate of the control quantity variably in dependence on duration of the predetermined time period.

In still another preferred mode for carrying out the invention, the output power control apparatus further includes a temperature sensor for detecting temperature of the engine or alternatively that of the transmission to thereby output temperature information of the engine or alternatively that of the transmission, wherein the control quantity suppressing means may be so designed as to be capable of setting the predetermined time period variably in dependence on the temperature information.

In a further preferred mode for carrying out the invention, the output power control apparatus may further include a rotation speed sensor for detecting rotation number (rpm) of the engine to thereby output the rotation number information of the engine, wherein the control quantity suppressing means may be so designed as to be capable of setting the predetermined time period variably in dependence on the rotation number information.

In a yet further preferred mode for carrying out the invention, the control quantity suppressing means may be so designed as to start operation for setting the control quantity in accordance with the accelerator pedal actuation quantity after lapse of the predetermined time period when the information of the accelerator pedal actuation quantity indicates accelerating operation after the shift operation of the transmission from the neutral range to the drive range.

In a still further preferred mode for carrying out the invention, the output power control apparatus may further include a temperature sensor for detecting temperature of the engine or alternatively that of the transmission to thereby output temperature information of the engine or alternatively that of the transmission, wherein the control quantity suppressing means may be so designed as to be capable of setting the increasing rate of the control quantity variably in dependence on the temperature information after lapse of the predetermined time period.

In a further preferred mode for carrying out the invention, the output power control apparatus may further include a rotation speed sensor for detecting rotation number (rpm) of the engine to thereby output rotation number information, wherein the control quantity suppressing means may be so designed as to be capable of setting the increasing rate of the control quantity variably in dependence on the rotation number information after lapse of the predetermined time period.

In a yet further preferred mode for carrying out the invention, the output power control apparatus may further include a throttle position sensor for detecting an opening degree of the throttle valve to thereby output throttle opening degree information, wherein the throttle control means may be so designed as to determine arithmetically a desired throttle opening degree of the throttle valve on the basis of at least the shift information and the information of the accelerator pedal actuation quantity and set the control quantity on the basis of deviation of the throttle opening degree indicated by the throttle opening degree information from the desired throttle opening degree.

In a still further preferred mode for carrying out the invention, the output power control apparatus may further include an actual shift information generating means for generating actual shift information on the basis of shift information of the transmission, wherein the control quantity suppressing means incorporated in the throttle control means may be so designed as to set the predetermined time period on the basis of the actual shift information.

In a further preferred mode for carrying out the invention, the output power control apparatus may further include a bypass air passage provided in association with the intake pipe so as to allow the intake air to bypass the throttle valve, and a bypass valve for adjusting an amount of intake air flowing through the bypass air passage, wherein the control quantity suppressing means incorporated in the throttle control means may be so designed as to decrease opening degree of the bypass valve over the predetermined time period.

Owing to the arrangements described above, abrupt or sudden start of the motor vehicle as well as shift shock which may occur upon shift operation of the transmission from the neutral range (N range) to the drive range (D range) can be suppressed or prevented with enhanced reliability. Thus, according to the present invention, there can be provided an output power control apparatus for the internal combustion engine of the motor vehicle, which apparatus can enhance significantly the drivability of a motor vehicle substantially independently from shift operation of the transmission.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which.

DESCRIPTION OF THE PREFERRED EMBODIMENTS

The present invention will be described in detail in conjunction with what is presently considered as preferred or typical embodiments thereof by reference to the drawings. In the following description, the components or units which are same as or equivalent to those described hereinbefore in conjunction with the background techniques are designated by like reference characters and repeated description thereof is omitted.

Embodiment 1

Figure 1:
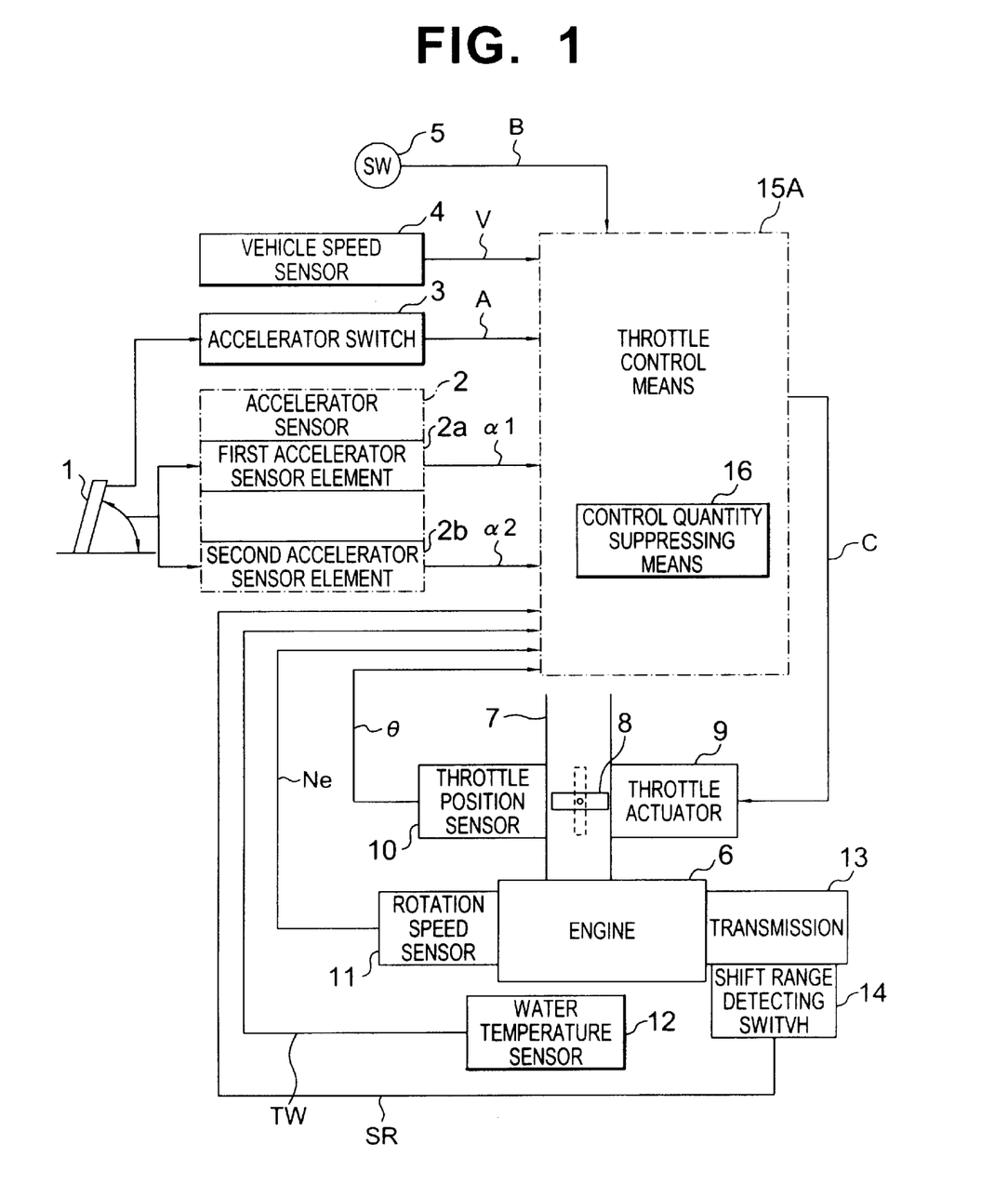
FIG. 1 is a block diagram showing a general arrangement of an output power control apparatus for an internal combustion engine of a motor vehicle according to a first embodiment of the present invention.

FIG. 1 is a block diagram showing a general arrangement of an output power control apparatus for an internal combustion engine of a motor vehicle according to a first embodiment of the present invention.

Referring to the figure, a throttle control means 15A is so designed as to arithmetically determine the desired throttle opening degree $\theta_o$ of the throttle valve 8 at least on the basis of the shift information SR and the accelerator pedal actuation quantity $\alpha$ and at the same time set the control quantity C in accordance with a deviation or difference $\Delta\theta$ between the throttle opening degree $\theta$ and the desired throttle opening degree $\theta_o$, as in the case of the conventional output power control apparatus.

In the output power control apparatus according to the instant embodiment of the invention, the throttle control means 15A includes a control quantity suppressing means 16 for suppressing the control quantity C in response to the shift information SR which indicates the shift operation of the transmission from the N range to the D range over a predetermined time period succeeding to the shift operation.

With the control quantity suppressing means 16, the predetermined time period during which the control quantity C is suppressed is so set as to correspond to the delay time td involved till the transmission 13 actually starts to operate in the D range.

More specifically, the control quantity suppressing means 16 suppresses the increasing rate of the control quantity C so that it remains smaller than a predetermined value inclusive thereof over a predetermined time period starting from the time point at which the transmission 13 is shifted from the N range to the D range.

Furthermore, the control quantity suppressing means 16 is so designed that when the accelerator pedal actuation quantity $\alpha$ indicates the accelerating operation after the shift operation of the transmission 13 from the N range to the D range, operation for setting the control quantity C corresponding to the accelerator pedal actuation quantity $\alpha$ is started after lapse of the above-mentioned predetermined time period.

Besides, the control quantity suppressing means 16 is so designed as to be capable of setting variably the increasing rate of the control quantity C in accordance with the length of the predetermined time period mentioned above.

Figure 2:
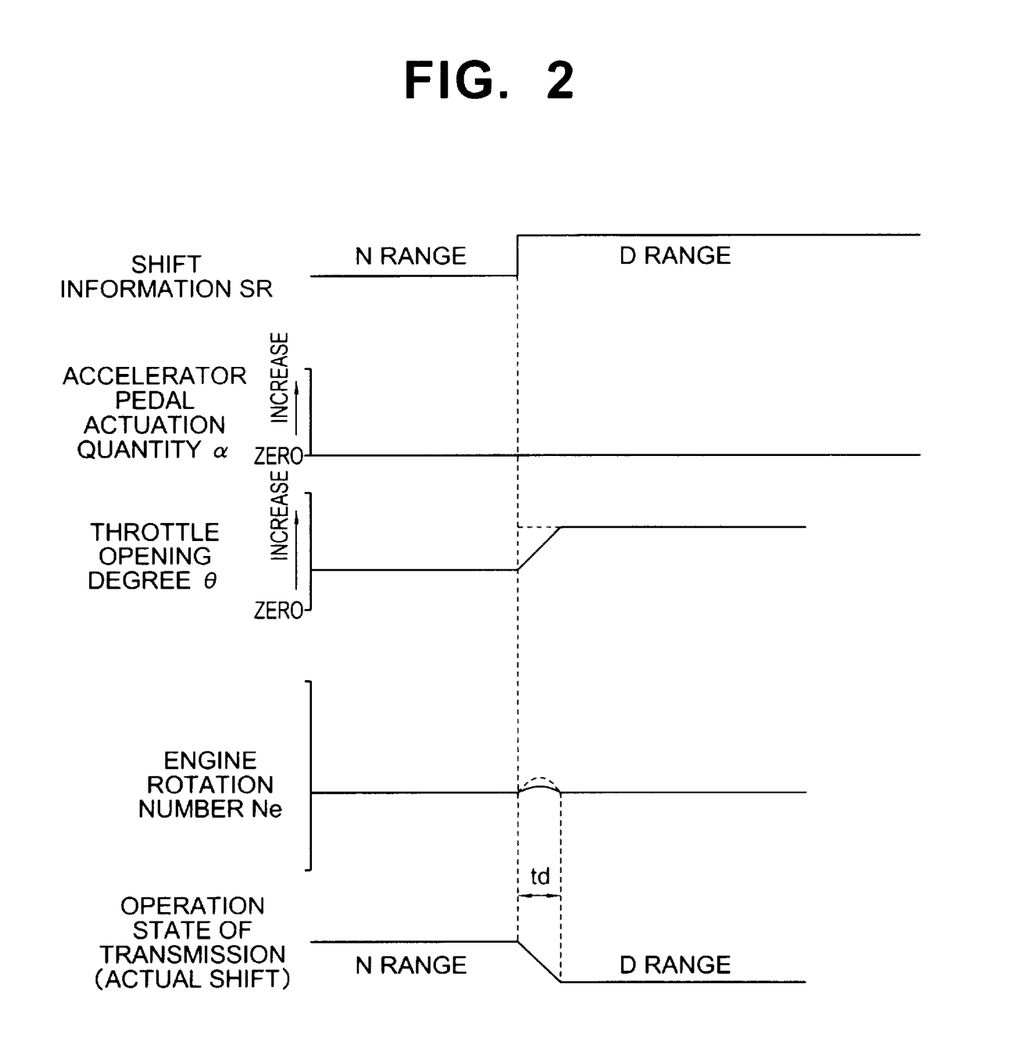
FIG. 2 is a timing chart for illustrating operation of the engine output control apparatus according to the first embodiment of the invention in the case where an accelerator pedal is not actuated.
Figure 3:
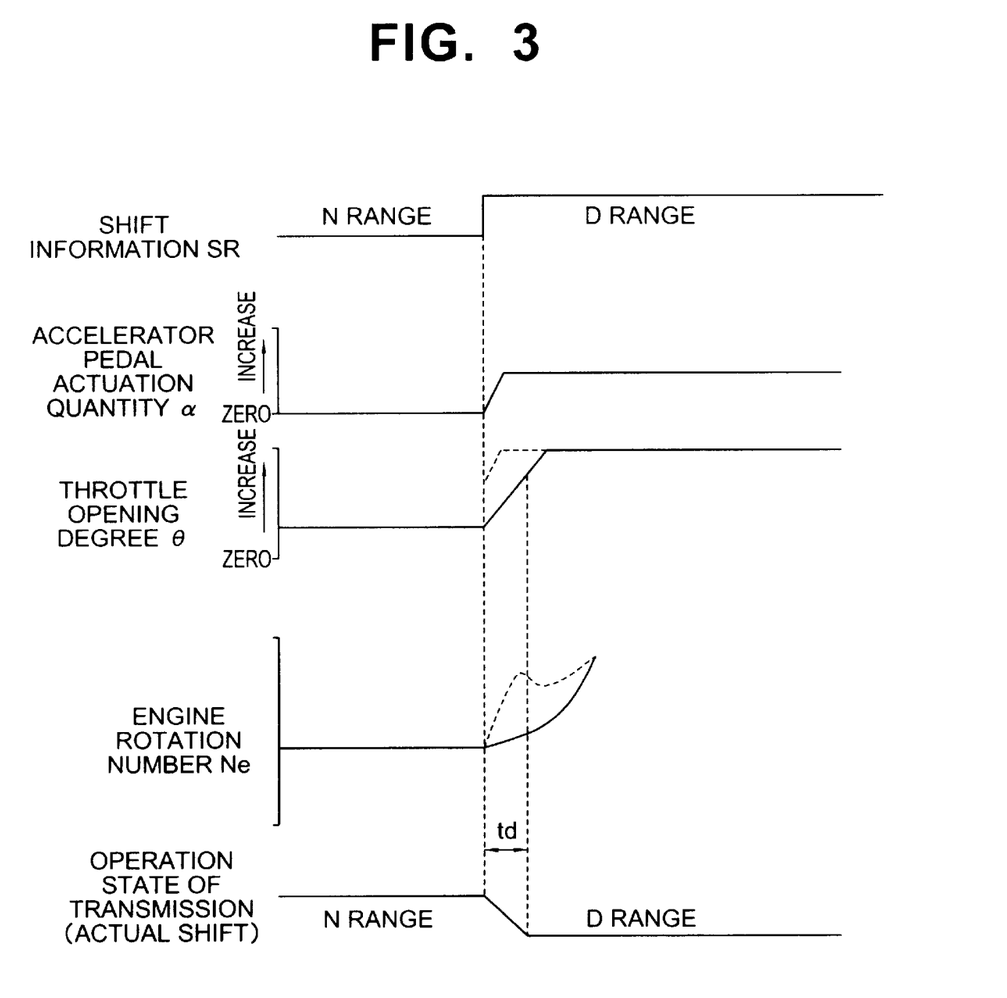
FIG. 3 is timing chart for illustrating operation of the engine output control apparatus according to the first embodiment of the invention in the case where the accelerator pedal is actuated after transmission shift operation.
Figure 4:
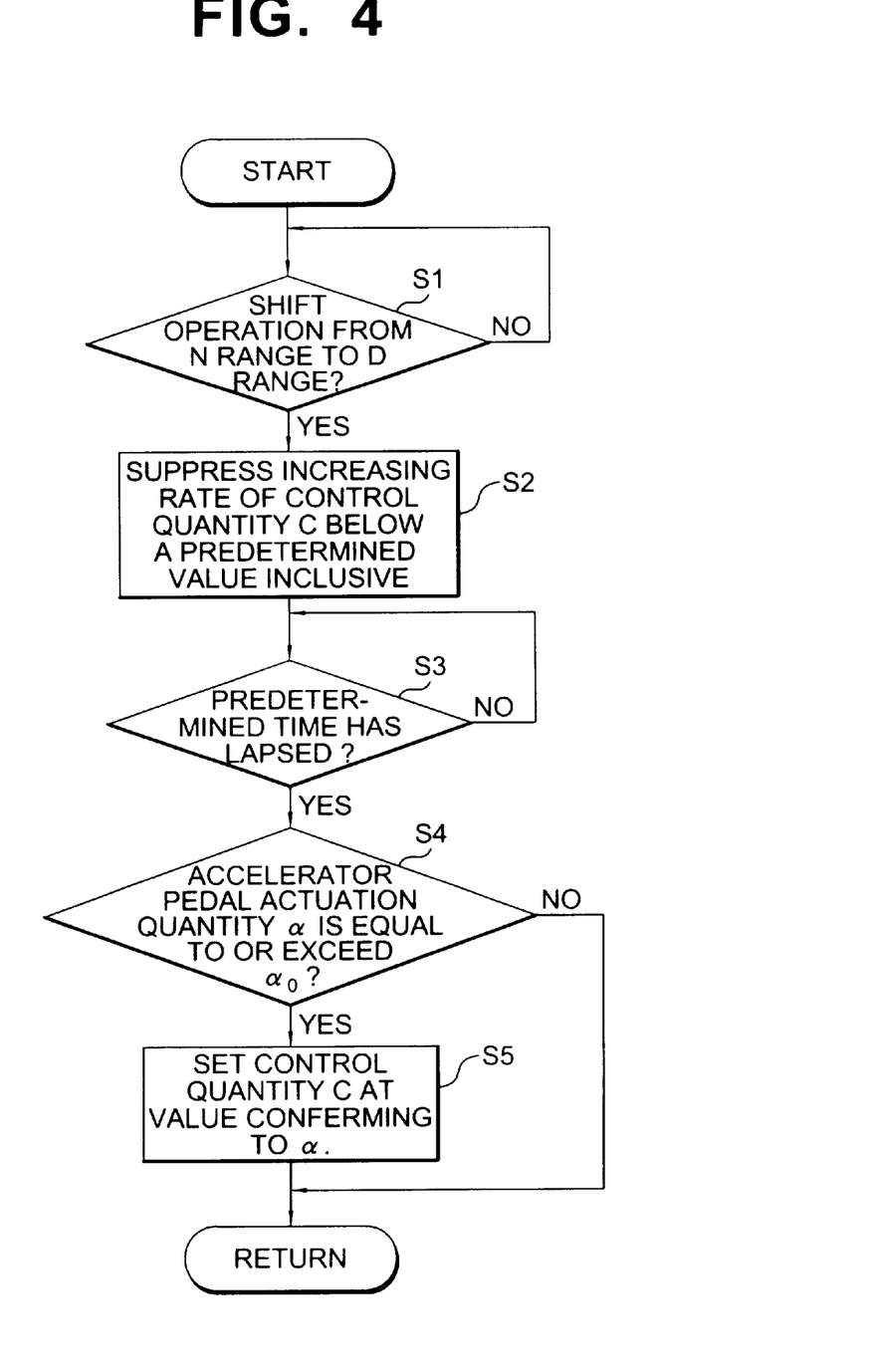
FIG. 4 is a flow chart for illustrating operation for suppressing a control quantity in the engine output control apparatus according to the first embodiment of the invention.

Next, referring to time charts shown in FIGS. 2 and 3 together with a flow chart of FIG. 4, description will be directed to operations of the output power control apparatus according to the first embodiment of the invention shown in FIG. 1. Parenthetically, FIG. 2 shows operation of the output power control apparatus according to the instant embodiment in the case where the accelerator pedal 1 is not actuated, and FIG. 3 shows the case where the accelerator pedal 1 is actuated after the shift operation. In FIGS. 2 and 3 broken line curves represent changes or variations in the throttle opening degree $\theta$ and the engine rotation number Ne (rpm) in the conventional apparatus described hereinbefore.

Now, it is assumed that in the state in which operation of the engine 6 has been started after the main switch 5 was closed by the driver, he or she performs shift manipulation for shifting the transmission 13 to the D range from the N range.

In response, the control quantity suppressing means 16 incorporated in the throttle control means 15A makes decision on the basis of the shift information SR whether the shift operation of the transmission 13 to the D range from the N range has been realized. See step S1 shown in FIG. 4. So long as the shift operation is not carried out, the control quantity suppressing means 16 remains in a standby state, and thus the ordinary control state is maintained continuously.

When it is decided in the step S1 that the shift operation of the transmission 13 to the D range from the N range has been performed (i.e., when the decision step S1 results in affirmation "YES"), then the control quantity suppressing means 16 controls the control quantity C for the throttle actuator 9 such that the increasing rate of the control quantity C remains lower than a predetermined level or value inclusive thereof over a predetermined time period substantially equal to the delay time td which is involved in the shift operation of the transmission 13 as described hereinbefore (see steps S2 and S3).

Subsequently, decision is made as to whether or not the accelerator pedal actuation quantity α is greater than a predetermined actuation quantity αo in a step S4. When it is decided in the step S4 that the former is not greater than the latter, i.e., α<αo (i.e., when the decision step S4 results in negation "NO"), the processing routine shown in FIG. 4 is terminated, whereupon the processing makes return to the start step.

Through the procedure described above, the throttle opening degree θ increases gradually over the predetermined time period so as to approximate the actual shift quantity of the transmission 13 during the delay time td, as indicated by solid line curve shown in FIG. 2.

In this way, increase of the engine rotation number Ne (rpm) is suppressed adequately when compared with the case of the conventional engine output control apparatus (see broken line curve in FIG. 2), whereby shock which may otherwise occur upon shift operation of the transmission 13 can be suppressed with the abrupt start of the motor vehicle being prevented.

On the other hand, when the driver has depressed the accelerator pedal 1 in succession to the shift operation of the transmission 13 from the N range to the D range, decision in the step S4 will result in that α≧αo (i.e., "YES").

In that case, the throttle control means 15A sets the control quantity C corresponding to the accelerator pedal actuation quantity α after lapse of the predetermined time period corresponding to the delay time td with the aid of the control quantity suppressing means 16 (step S5), as in the case of the processing in the step S3 described previously, whereupon the processing procedure illustrated in FIG. 4 comes to an end.

Thus, the throttle opening degree θ increases gradually, as indicated by a solid line curve in FIG. 3, and at a time point at which the actual shift operation of the transmission 13 has been completed, the throttle opening degree θ restarts to increase in dependence on the accelerator pedal actuation quantity α.

In this manner, even when the accelerator pedal 1 has been depressed before completion of the shift operation of the transmission 13, the flow rate of the intake air fed to the engine 6 is prevented from increasing excessively. Thus, the shift shock which may otherwise occur upon shift operation of the transmission 13 can be suppressed. Further, the abrupt start of the motor vehicle can be prevented positively.

As will be appreciated from the foregoing, owing to such arrangement of the engine output control apparatus that upon shift operation of the transmission 13 from the N range to the D range, the increasing rate of the throttle opening degree θ is so set as not to exceed the predetermined value in succession to the shift operation in response to the operation timing signal while the control quantity C for increasing correctively the throttle opening degree θ is suppressed to a proper or appropriate value such that the increase of the intake air flow rate for coping with increase in the load applied to the transmission 13 is realized only gradually, it is possible to prevent not only the abrupt start of the motor vehicle but also occurrence of uncomfortable or disagreeable shock upon shifting of the transmission 13.

Furthermore, by correcting the throttle opening degree θ corresponding to the accelerator pedal actuation quantity α upon accelerating operation succeeding to the shift operation of the transmission 13 from the N range to the D range by controlling the throttle opening degree θ after the start of the actual shift operation, the abrupt start of the motor vehicle as well as the so-called shift shock can be prevented. Thus, drivability of the motor vehicle can be enhanced. In other words, the internal combustion engine for the motor vehicle equipped with the engine output control apparatus according to the present invention will be able to enjoy high evaluation on the market.

Embodiment 2

In the case of the engine output control apparatus according to the first embodiment of the invention, it is presumed that the delay time td involved in the operation of the transmission 13 is constant and that the predetermined time period during which the suppressing function of the control quantity suppressing means 16 is effective is set to a constant value. However, the predetermined time period mentioned above may be set variable in consideration of the fact that the delay time td will vary.

In general, it is known that the delay time td involved in the shift operation of the transmission 13 varies in dependence on change of temperature. Accordingly, the control quantity suppressing means in the output power control apparatus for the internal combustion engine of the motor vehicle according to a second embodiment of the invention is so designed as to set the predetermined time period for suppressing the control quantity C to be variable in dependence on the cooling water temperature TW derived from the output of the water temperature sensor 12 (or alternatively the oil temperature of the transmission 13).

More specifically, when the cooling water temperature TW (or the oil temperature of the transmission 13) increases as the warm-up operation of the engine 6 proceeds, the delay time td becomes shorter. Consequently, the control quantity suppressing means 16 sets the predetermined time period to be short in correspondence to the delay time td. Parenthetically, in the output power control apparatus for the internal combustion engine of the motor vehicle now under consideration, the water temperature TW of the engine 6 is utilized as the temperature information.

By setting shorter the predetermined time period mentioned previously as the delay time td becomes shorter, the throttle opening degree θ is correctively increased relatively early, which is reflected to the vehicle speed V. Thus, the driver who is depressing the accelerator pedal 1 will feel essentially no uncomfortableness.

By the way, assuming that the predetermined time period is set at a fixed value and that the delay time td becomes shorter, the throttle opening degree θ will then be suppressed in excess beyond the desirable throttle opening degree, as a result of which the accelerator pedal actuation quantity α is prevented from being reflected onto the vehicle speed V. Thus, the driver may depress the accelerator pedal 1 further, feeling disagreeableness.

Since the cold state as well as the warm-up state of the engine 6 is reflected not only to the water temperature TW giving the temperature information but also onto the engine rotation number Ne (rpm), the control quantity suppressing means 16 may also be so designed as to set the predetermined time period for suppressing the control quantity C in dependence on the engine rotation number Ne (rpm) determined on the basis of the output of the rotation speed sensor 11.

Embodiment 3

In the case of the engine output control apparatus according to the first embodiment of the invention, the increasing rate of the control quantity C is set at a predetermined value corresponding to the accelerator pedal actuation quantity α after lapse of the predetermined time period when the accelerating operation is carried out after the shift operation of the transmission 13. However, the increasing rate of the control quantity C may be set variable in dependence on variation of the delay time td.

Figure 5:
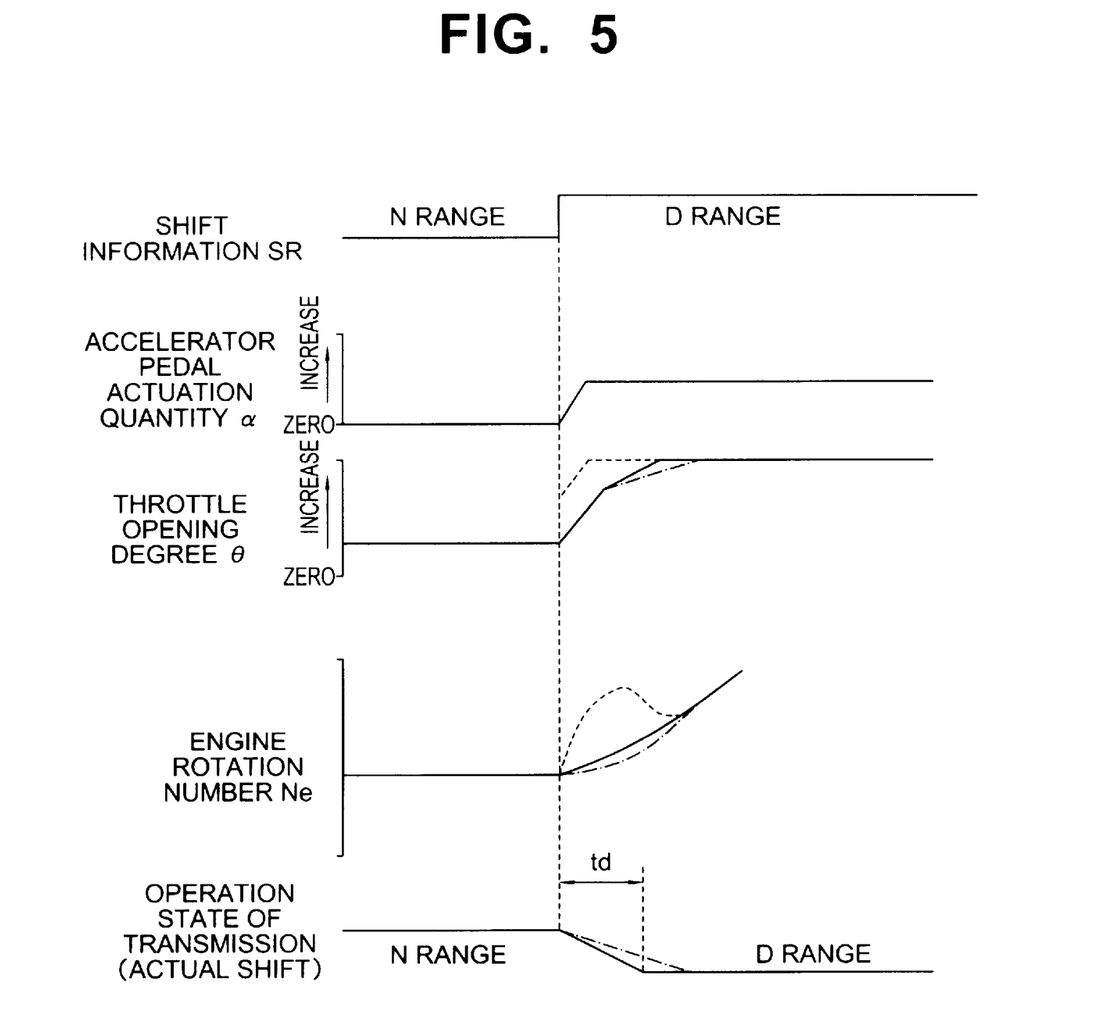
FIG. 5 is a timing chart for illustrating operation of the engine output control apparatus according to a third embodiment of the present invention.

A third embodiment of the invention is directed to the engine output control apparatus in which the control quantity C is set variable in dependence on the delay time td. FIG. 5 is a timing chart for illustrating operation of the engine output control apparatus according to a third embodiment of the present invention.

Referring to FIG. 5, it is presumed that the cooling water temperature TW is relatively low and that the delay time td is relatively long when compared with that of the engine output control apparatus described hereinbefore by reference to FIG. 3. In FIG. 5, broken line curves represent operations of the conventional engine output control apparatus, and single-dotted broken line curves represent operations of the engine output control apparatus in case the delay time td is longer.

As described previously, the delay time td varies in dependence on the range of the engine temperature. Accordingly, the control quantity suppressing means 16 is so designed as to predict the delay time td on the basis of the information concerning the cooling water temperature TW or the engine rotation number Ne (rpm), to thereby set the increasing rate of the control quantity C to be variable.

Referring to FIG. 5, since the delay time td of the transmission 13 is relatively long, the increasing rate of the control quantity C corresponding to the accelerator pedal actuation quantity (pedal depression stroke) α is set at a smaller value when compared with that described hereinbefore. Thus, the throttle opening degree θ is increased correctively at a lower increasing rate.

With the arrangement described above, the driver depressing the accelerator pedal 1 will feel substantially no disagreeableness even when the throttle opening degree θ is increased correctively after lapse of the predetermined time period because the rate of change of the throttle opening degree θ is low when the throttle opening degree θ is increased correctively.

In particular, in the case where the delay time td is long, the accelerator pedal actuation quantity α is not reflected onto the control quantity C over an extended predetermined time period. Consequently, the accelerator pedal actuation quantity α is likely to increase continuously with the accelerator pedal being depressed by the driver. As a result of this, when the accelerator pedal actuation quantity α is reflected onto the control quantity C immediately upon lapse of the predetermined time period, the shift shock of large magnitude tends to occur. Accordingly, it is desirable to further suppress the increasing rate of the control quantity C, as described above.

On the contrary, when the delay time td becomes shorter due to high temperature of the cooling water, the increasing rate of the control quantity C may be set at a large value so that the throttle opening degree θ can be correctively increased relatively speedily. As a result of this, the accelerator pedal actuation quantity α is reflected speedily onto the vehicle speed V. Thus, the driver depressing the accelerator pedal 1 will feel substantially no disagreeableness.

On the other hand, when the delay time td becomes longer as compared with that indicated by the solid line curve (see the single-dotted line curves shown in FIG. 5), the increasing rate of the control quantity C will become further lower. Consequently, the increasing rates of the throttle opening degree θ and the engine rotation number Ne (rpm) will further decrease, whereby the shift shock can be mitigated with high reliability.

As is apparent from the foregoing, by setting variably the increasing rate of the throttle opening degree θ upon corrective increasing thereof, abrupt start of the motor vehicle as well as occurrence of the shift shock can be prevented.

Embodiment 4

In the engine output control apparatus according to the first embodiment of the invention, the throttle control means 15A is so designed as to arithmetically determine the control quantity C on the basis of the deviation Δθ of the actual throttle opening degree θ from the desired throttle opening degree θo. In the engine output control apparatus according to a fourth embodiment of the present invention, the throttle control means 15A is so designed as to arithmetically determine the control quantity C on the basis of the desired engine output torque.

Embodiment 5

In the engine output control apparatus according to the first embodiment of the invention, the predetermined time period for suppressing the control quantity is set substantially equal or equivalent to the delay time td of the transmission 13. In the engine output control apparatus according to a fifth embodiment of the invention, the above-mentioned predetermined time period is set in dependence on the condition for operation of the engine independent of the delay time td.

Embodiment 6

In the engine output control apparatus according to the first embodiment of the invention, parameters for the suppression of the control quantity C are set only with the aid of the control quantity suppressing means 16 incorporated in the throttle control means 15A. In the engine output control apparatus according to a sixth embodiment of the invention, actual shift information is additionally generated by a control means provided in association with the transmission 13 to thereby output it to the control quantity suppressing means.

Figure 6:
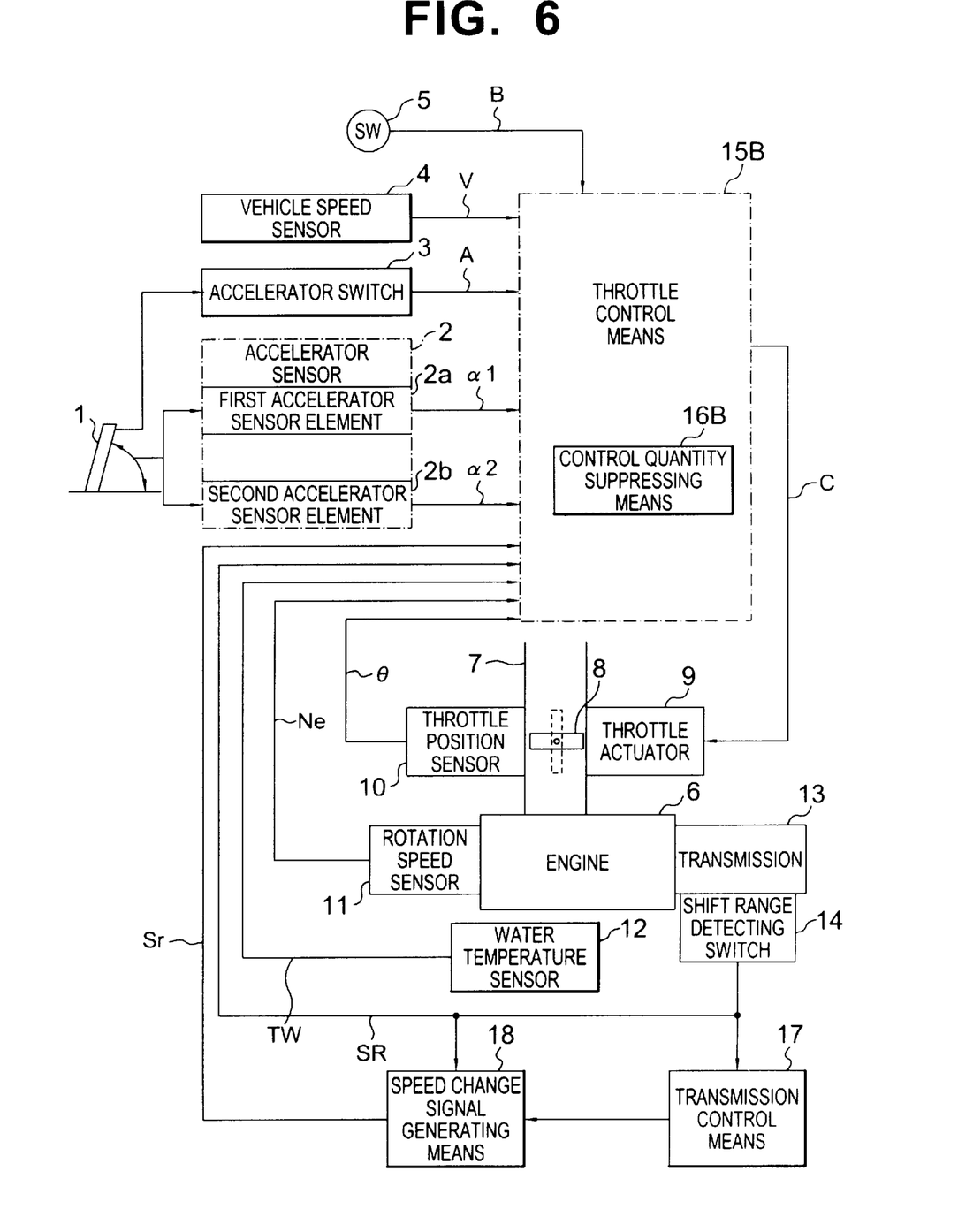
FIG. 6 is a block diagram showing a general arrangement of an output power control apparatus for an internal combustion engine of a motor vehicle according to a sixth embodiment of the present invention.

The following description will be directed to the engine output control apparatus according to the sixth embodiment of the invention in which the actual shift information is additionally generated by the control means provided in association with the transmission by reference to FIG. 6 which is a block diagram showing a general arrangement of the output power control apparatus for an internal combustion engine of a motor vehicle according to the sixth embodiment of the invention. In the figure, components or units same as or equivalent to those described hereinbefore are denoted by like reference symbols, and repeated description thereof is omitted.

Referring to FIG. 6, a control quantity suppressing means 16B incorporated in a throttle control means 15B is so designed as to set the parameter(s) for suppression of the control quantity (such as the predetermined time period mentioned previously) on the basis of actual shift information Sr (described hereinafter) of the transmission 13 in addition to the various sensor information mentioned previously.

On the other hand, the transmission 13 is controlled by a transmission control means 17 on the basis of the shift information SR.

A speed-change signal generating means 18 provided in association with the transmission control means 17 is so designed as to output as the actual shift information Sr the actual speed-change signal of the transmission 13, the delay time td, a shift operation completion signal, etc.

Thus, the control quantity suppressing means 16B can set the predetermined time period mentioned previously on the basis of not only the shift information SR generated by the shift range detecting switch 14 but also the actual shift information Sr supplied from the speed-change signal generating means 18, whereby the reliability of the parameter(s) for suppressing the control quantity C can be enhanced. Thus, the abrupt start of the motor vehicle and the shift shock can be suppressed with much enhanced reliability.

Embodiment 7

In the case of the engine output control apparatus according to the first embodiment of the invention, only the throttle actuator 9 is controlled by the throttle control means 15A. However, the throttle control means 15A may be so arranged as to control additionally the bypass valve 20 serving for regulating the amount or flow rate of bypass intake air which flows, bypassing the throttle valve 8.

A seventh embodiment of the invention directed to the engine output control apparatus which is arranged to control the bypass valve additionally by the throttle control means will be described by reference to FIG. 7 which is a block diagram showing generally an arrangement of the engine output control apparatus according to the seventh embodiment of the invention. Parenthetically, in FIG. 7, components and units which are same as or equivalent to those described hereinbefore are designated by like reference symbols and repeated description thereof is omitted.

Figure 7:
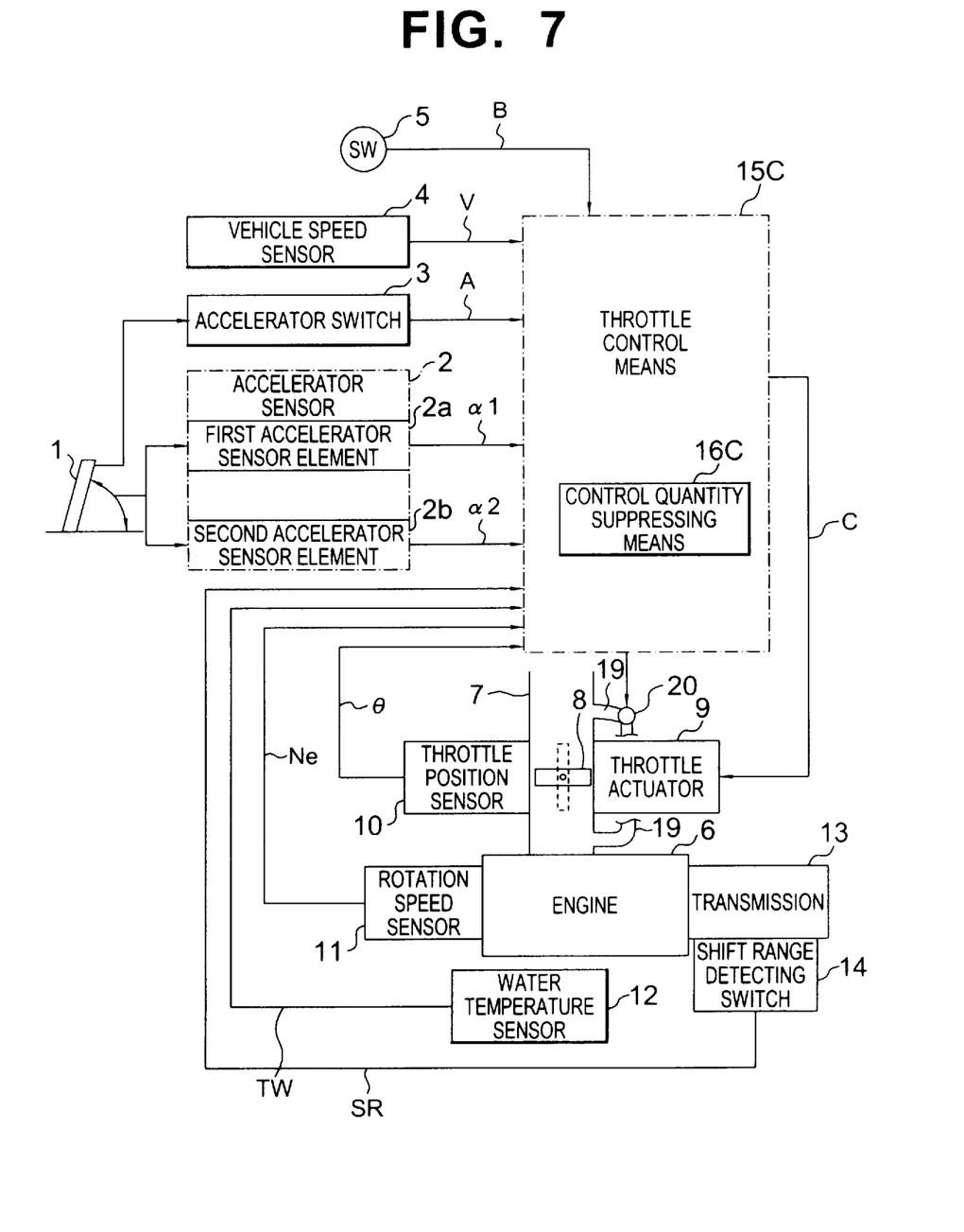
FIG. 7 is a block diagram showing a general arrangement of an output power control apparatus for an internal combustion engine of a motor vehicle according to a seventh embodiment of the present invention.

Referring to FIG. 7, the intake pipe 7 is provided with a bypass air passage 19 so that the intake air can flow while bypassing the throttle valve 8. The bypass air passage 19 in turn is provided with a bypass valve 20 for regulating the flow rate of the intake air flowing through the bypass air passage 19.

According to a teaching of the invention incarnated in the seventh embodiment, the control quantity suppressing means 16C incorporated in the throttle control means 15C is so designed as to control not only the control quantity C for the throttle actuator 9 but also the flow rate of the intake air fed to the engine 6 by reducing the opening degree of the bypass valve 20.

By virtue of the arrangement described above, increase of the engine rotation number Ne (rpm) after the shift operation of the transmission 13 from the N range to the D range can further be suppressed, whereby abrupt start of the motor vehicle as well as occurrence of the shift shock can be suppressed with further enhanced reliability.

Many modifications and variations of the present invention are possible in the light of the above techniques. It is therefore to be understood that within the scope of the appended claims, the invention may be practiced otherwise than as specifically described.

What is claimed is:

1. An output power control apparatus for an internal combustion engine of a motor vehicle, comprising:

an intake pipe for supplying intake air to an internal combustion engine mounted on a motor vehicle;

a throttle valve installed in said intake pipe for regulating an amount of the intake air supplied to said engine;

a throttle actuator for adjusting an opening degree of said throttle valve;

a transmission for transmitting output power of said engine to a wheel system of said motor vehicle;

shift information detecting means for detecting shift of said transmission to thereby generate shift information;

an accelerator sensor for detecting an accelerator stroke of an accelerator pedal; and throttle control means for setting a control quantity for said throttle actuator on the basis of at least said shift information and said accelerator pedal actuation quantity, wherein said throttle control means includes control quantity suppressing means for suppressing said control quantity, at least over a predetermined time period subsequent to a shift operation of said transmission, when said shift information indicates a shift operation of the transmission from a neutral range to a drive range, and wherein said control quantity suppressing means is operative to suppress an increase in the rate of said control quantity, such that it is equal to or lower than a predetermined value calculated over said predetermined time period subsequent to a shift operation of said transmission form said neutral range to said drive range.

2. An output power control apparatus for an internal combustion engine of a motor vehicle as set forth in claim 1, wherein said predetermined time period is so set as to correspond to a delay time involved before operation of said transmission becomes effective in reality at the shifted position.

3. An output power control apparatus for an internal combustion engine of a motor vehicle as set forth in claim 1, wherein said control quantity suppressing means is so designed as to be capable of setting the increasing rate of said control quantity variably in dependence on duration of said predetermined time period.

4. An output power control apparatus for an internal combustion engine of a motor vehicle as set forth in claim 3, further comprising:

a temperature sensor for detecting temperature of said engine or alternatively that of said transmission to thereby output temperature information of said engine or alternatively that of said transmission, wherein said control quantity suppressing means is so designed as to be capable of setting said predetermined time period variably in dependence on said temperature information.

5. An output power control apparatus for an internal combustion engine of a motor vehicle as set forth in claim 3, further comprising:

a rotation speed sensor for detecting rotation number of said engine to thereby output said rotation number information of said engine, wherein said control quantity suppressing means is so designed as to be capable of setting said predetermined time period variably in dependence on said rotation number information.

6. An output power control apparatus for an internal combustion engine of a motor vehicle, comprising:

an intake pipe for supplying intake air to an internal combustion engine mounted on a motor vehicle;

a throttle valve installed in said intake pipe for regulating an amount of the intake air supplied to said engine;

a throttle actuator for adjusting an opening degree of said throttle valve;

a transmission for transmitting output power of said engine to a wheel system of said motor vehicle;

shift information detecting means for detecting shift of said transmission to thereby generate shift information;

an accelerator sensor for detecting an accelerator stroke of an accelerator pedal; and throttle control means for setting a control quantity for said throttle actuator on the basis of at least said shift information and said accelerator pedal actuation quantity, wherein said throttle control means includes control quantity suppressing means for suppressing said control quantity, at least over a predetermined time period subsequent to a shift operation of said transmission, when said shift information indicates a shift operation of the transmission from a neutral range to a drive range, and further wherein said control quantity suppressing means is so designed as to start operation for setting said control quantity in accordance with said accelerator pedal actuation quantity after lapse of said predetermined time period when the information of said accelerator pedal actuation quantity indicates accelerating operation after the shift operation of said transmission from said neutral range to said drive range, and further comprising:

a temperature sensor for detecting temperature of said engine or alternatively that of said transmission to thereby output temperature information of said engine or alternatively that of said transmission, wherein said control quantity suppressing means is so designed as to be capable of setting the increasing rate of said control quantity variably in dependence on said temperature information after lapse of said predetermined time period.

7. An output power control apparatus for an internal combustion engine of a motor vehicle as set forth in claim 1, wherein said control quantity suppressing means is so designed as to start operation for setting said control quantity in accordance with said accelerator pedal actuation quantity after lapse of said predetermined time period when the information of said accelerator pedal actuation quantity indicates accelerating operation after the shift operation of said transmission from said neutral range to said drive range, and further comprising:

a rotation speed sensor for detecting rotation number of said engine to thereby output rotation number information, wherein said control quantity suppressing means is so designed as to be capable of setting the increasing rate of said control quantity variably in dependence on said rotation number information after lapse of said predetermined time period.

8. An output power control apparatus for an internal combustion engine of a motor vehicle, comprising:

an intake pipe for supplying intake air to an internal combustion engine mounted on a motor vehicle;

a throttle valve installed in said intake pipe for regulating an amount of the intake air supplied to said engine;

a throttle actuator for adjusting an opening degree of said throttle valve;

a transmission for transmitting output power of said engine to a wheel system of said motor vehicle;

shift information detecting means for detecting shift of said transmission to thereby generate shift information;

an accelerator sensor for detecting an accelerator stroke of an accelerator pedal; and throttle control means for setting a control quantity for said throttle actuator on the basis of at least said shift information and said accelerator pedal actuation quantity, wherein said throttle control means includes control quantity suppressing means for suppressing said control quantity at least over a predetermined time period subsequent to a shift operation of said transmission, when said shift information indicates a shift operation of the transmission from a neutral range to a drive range, and further comprising:

a throttle position sensor for detecting an opening degree of said throttle valve to thereby output throttle opening degree information, wherein said throttle control means is so designed as to determine arithmetically a desired throttle opening degree of said throttle valve on the basis of at least said shift information and the information of said accelerator pedal actuation quantity and set said control quantity on the basis of deviation of said throttle opening degree indicated by said throttle opening degree information from said desired throttle opening degree.

9. An output power control apparatus for an internal combustion engine of a motor vehicle as set forth in claim 1, further comprising;

actual shift information generating means for generating actual shift information on the basis of shift information of said transmission, wherein said control quantity suppressing means incorporated in said throttle control means is so designed as to set said predetermined time period on the basis of said actual shift information.

10. An output power control apparatus for an internal combustion engine of a motor vehicle, comprising:

an intake pipe for supplying intake air to an internal combustion engine mounted on a motor vehicle;

a throttle valve installed in said intake pipe for regulating an amount of the intake air supplied to said engine;

a throttle actuator for adjusting an opening degree of said throttle valve;

a transmission for transmitting output power of said engine to a wheel system of said motor vehicle;

shift information detecting means for detecting shift of said transmission to thereby generate shift information;

an accelerator sensor for detecting a accelerator stroke of an accelerator pedal; and throttle control means for setting a control quantity for said throttle actuator on the basis of at least said shift information and said accelerator pedal actuation quantity, wherein said throttle control means includes control quantity suppressing means for suppressing said control quantity, at least over a predetermined time period subsequent to a shift operation of said transmission, when said shift information indicates a shift operation of the transmission from a neutral range to a drive range, and further comprising:

a bypass air passage provided in association with said intake pipe so as to allow said intake air to bypass said throttle valve; and a bypass valve for adjusting an amount of intake air flowing through said bypass air passage, wherein said control quantity suppressing means incorporated in said throttle control means is so designed as to decrease opening degree of said bypass valve over said predetermined time period.

* * * * *